United States Patent
St. Louis et al.

(10) Patent No.: US 7,415,779 B2
(45) Date of Patent: Aug. 26, 2008

(54) DEPTH SETTING TOOL FOR COMBUSTION DYNAMICS MONITORING SYSTEM

(75) Inventors: Robert Thomas St. Louis, Greenville, SC (US); Dennis Lee Runyon, Greer, SC (US); Tyler Warren Jacobs, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/276,799

(22) Filed: Mar. 15, 2006

(65) Prior Publication Data

US 2008/0127503 A1   Jun. 5, 2008

(51) Int. Cl.
  *G01B 3/28* (2006.01)
  *G01B 21/18* (2006.01)
(52) U.S. Cl. .......................................... 33/836; 33/833
(58) Field of Classification Search ................... 33/833, 33/836
See application file for complete search history.

(56) References Cited

U.S. PATENT DOCUMENTS

| | | | | |
|---|---|---|---|---|
| 1,266,977 A | * | 5/1918 | Nelis | 33/836 |
| 1,526,418 A | * | 2/1925 | Gronner | 33/836 |
| 2,335,513 A | * | 11/1943 | Hewitt | 33/836 |
| 4,219,936 A | | 9/1980 | Bridges | |
| 4,905,378 A | * | 3/1990 | Culver et al. | 33/836 |
| 5,170,569 A | | 12/1992 | Anderson | |
| 5,189,808 A | * | 3/1993 | Evans et al. | 33/836 |
| 6,848,193 B1 | * | 2/2005 | Kirzhner | 33/833 |
| 6,694,832 B1 | | 2/2006 | Gleeson | |
| 7,065,897 B2 | * | 6/2006 | Luner et al. | 33/836 |

* cited by examiner

*Primary Examiner*—Christopher W Fulton
(74) *Attorney, Agent, or Firm*—Sutherland Asbill & Brennan LLP

(57) ABSTRACT

A kit for setting turbine probe depth. The kit may include a male measurement fixture having an extended leg and an alignment barrel and a female measurement fixture having a depth rod.

20 Claims, 4 Drawing Sheets

DEPTH SETTING TOOL FOR COMBUSTION DYNAMICS MONITORING SYSTEM

TECHNICAL FIELD

The present application relates generally to gas turbines and more particularly relates to a depth setting tool for accurately positioning a combustion dynamics monitoring system probe about a combustion liner of a gas turbine.

BACKGROUND OF THE INVENTION

As part of the monitoring controls and diagnostic tools for a combustion system in a gas turbine, it is desired to measure and acquire data on the combustion dynamics. This combustion dynamics data can be used to determine the operational health of the combustion system as a whole and also may be used to tune the combustion system such that it is operating within an appropriate balance between combustion dynamics and emissions.

A combustion dynamics monitoring system is currently in use for certain types of gas turbines. Accurate and repeatable installation of the measurement tip of the probe of the combustion dynamics monitoring system is required for dependable measurements. Improperly installed dynamics probes can lead to inaccurate readings and possibly result in hardware damage and increased outages. The combustion dynamics monitoring system thus uses a depth setting tool that allows for accurate and repeatable installation depths of the measurement tip of the probe. An example of such a depth setting tool is shown in commonly owed U.S. Pat. No. 6,694,832 to Gleeson, entitled "Kit and Method for Setting Probe Depth". U.S. Pat. No. 6,694,832 is incorporated herein by reference.

These know depth setting tools, however, cannot be used with other known turbines. For example, known depth setting tools cannot work with E-class turbines sold by General Electric Company of Schenectady, N.Y. Specifically, the E-class turbines have a larger hole through the liner than through the casing and flow sleeve as compared to other types of turbines. As such, the known depth setting tools will not work with the E-class turbines.

Thus, there is a desire for a depth setting tool that can accommodate the geometry of E-class turbines and similar types of devices not currently served by known depth setting tools. The depth setting tool should provide accurate and repeatable installation of a combustion dynamics monitoring system probe and similar types of probes.

SUMMARY OF THE INVENTION

The present application thus describes a kit for setting turbine probe depth. The kit may include a male measurement fixture having an extended leg and an alignment barrel and a female measurement fixture having a depth rod.

The alignment barrel may include a threaded portion. A locking barrel may be positioned on the threaded portion. The alignment barrel may include a lock nut positioned on the threaded portion. The leg may include a foot and a nipple. The nipple may have a depth of about 0 about 0.1 inches (about 2.54 millimeters). The leg may include an offset position adjacent to the alignment barrel. The male measurement fixture may include an alignment tab positioned about the alignment barrel. The female measurement fixture may include a hollow body. The hollow body may include a male measurement fixture port and a depth rod port. The depth rod port is threaded and the depth rod may include a screw. The female measurement fixture may include a port fitting positioned about the male measurement fixture port. The port fitting may include a nut and a pair of ferrules.

The present application further describes a method of placing a probe at a target depth within a turbine casing having a liner. The method may include the steps of measuring a distance from a port fitting to a given distance from the liner with a first tool, manipulating the first tool to indicate the distance, inserting the first tool into a second tool, manipulating the second tool to indicate internally the distance, removing the first tool from the second tool, inserting the probe into the second tool and the port fitting, and manipulating the port fitting to indicate the distance.

The step of manipulating the first tool may include turning a locking barrel on an alignment barrel. The step of manipulating the second tool may include adjusting a depth rod. The step of manipulating the port fitting may include adjusting a pair of ferrules.

The present application further describes a kit for setting turbine probe depth. The kit may include a male measurement fixture having an extended leg and a threaded alignment barrel with a locking barrel positioned thereon, a female measurement fixture having a body and an adjustable depth rod, and a port fitting having a nut and a pair of ferrules. The leg may include a foot and a nipple. The male measurement fixture may have an alignment tab positioned about the alignment barrel.

These and other features of the present application will become apparent to one of ordinary skill in the art upon review of the following detailed description when taken in conjunction with the drawings and the appended claims.

DETAILED DESCRIPTION

Figure 1:
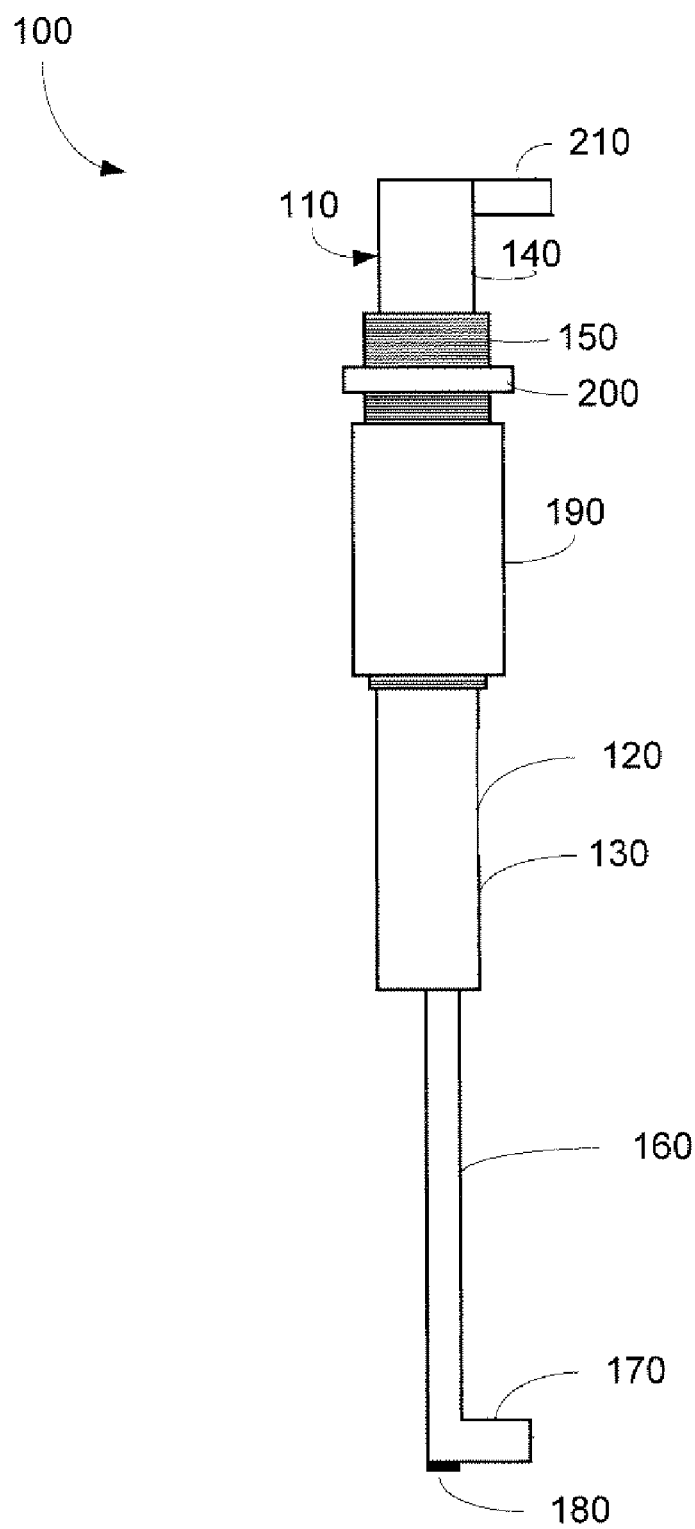
FIG. 1 is a side plan view of a male measurement fixture as used in the depth setting tool as is described herein.

Referring now to the drawings, in which like numerals refer to like parts throughout the several views, FIG. 1 shows part of a depth setting tool or kit 100 as is described herein. Specifically, FIG. 1 shows a male measurement fixture 110 of the depth setting tool or kit 100.

As is shown, the male measurement fixture 110 may include an alignment barrel 120. The alignment barrel 120 may be substantially circular in shape and may include a first smooth portion 130, a second smooth portion 140, and a threaded portion 150 positioned between the smooth portions 130, 140. Other shapes may be used herein.

Extending through and/or below the alignment barrel 120 may be a leg 160. The leg 160 may take any convenient shape and length. The leg 160 may be offset somewhat from the center of alignment barrel 120. The leg 160 extends into a foot 170. The foot 170 may take any convenient size and shape although the bottom of the foot 170 should be perpendicular to the leg 160. The leg 160 and the foot 170 may have a radius machined therein so as to allow the maximum length of the foot 170 to be used while still allowing for the leg 160 and the foot 170 to pass through the turbine components. A nipple 180 may be attached to the foot 170. The nipple 180 may have a height so as to position the foot 170 near the liner as will be described in more detail below. Any other position may be used herein.

Positioned on the threaded portion 150 of the alignment barrel 120 may be a locking barrel 190. The locking barrel 190 may be a tube-like structure with matching threads so as to maneuver up and down the threaded portion 150 of the alignment barrel 120. Positioned above the locking barrel 190 on the threaded portion 150 may be a locknut 200. The locknut 200 may be a conventional nut and may serve to lock the locking barrel 190 into position.

Attached to one end of the alignment barrel 120 may be an alignment tab 210. The alignment tab 210 faces the same direction as the foot 170. The alignment tab 210 ensures that the male measurement fixture 110 as a whole is always pointing in the correct direction.

The male measurement tool 110 may be made out of stainless steel, standard steel, or similar types of metals. The length of the male measurement fixture 110 may range from about 9.5 to about 10 inches (about 24.13 to about 24.4 centimeters) with a width of about 0.740 to about 0.745 inches (about 1.88 to about 1.89 centimeters). The leg 160 and the foot 170 may have a reduced diameter so as to fit into and through the turbine components. The leg 160 may have a length of about 3.25 to about 3.5 inches (about 8.255 to about 8.89 centimeters). Likewise, the foot 170 may have a length of about 0.20 to about 0.25 inches (about 0.51 to about 0.635 centimeters). The nipple 180 may have a width of up to about 0.75 inches (about 19.05 millimeters) and a depth of about 0 about 0.1 inches (about 2.54 millimeters). The shape and size of the male measurement fixture 110 as a whole may vary depending upon the nature of the turbine.

Figure 2:
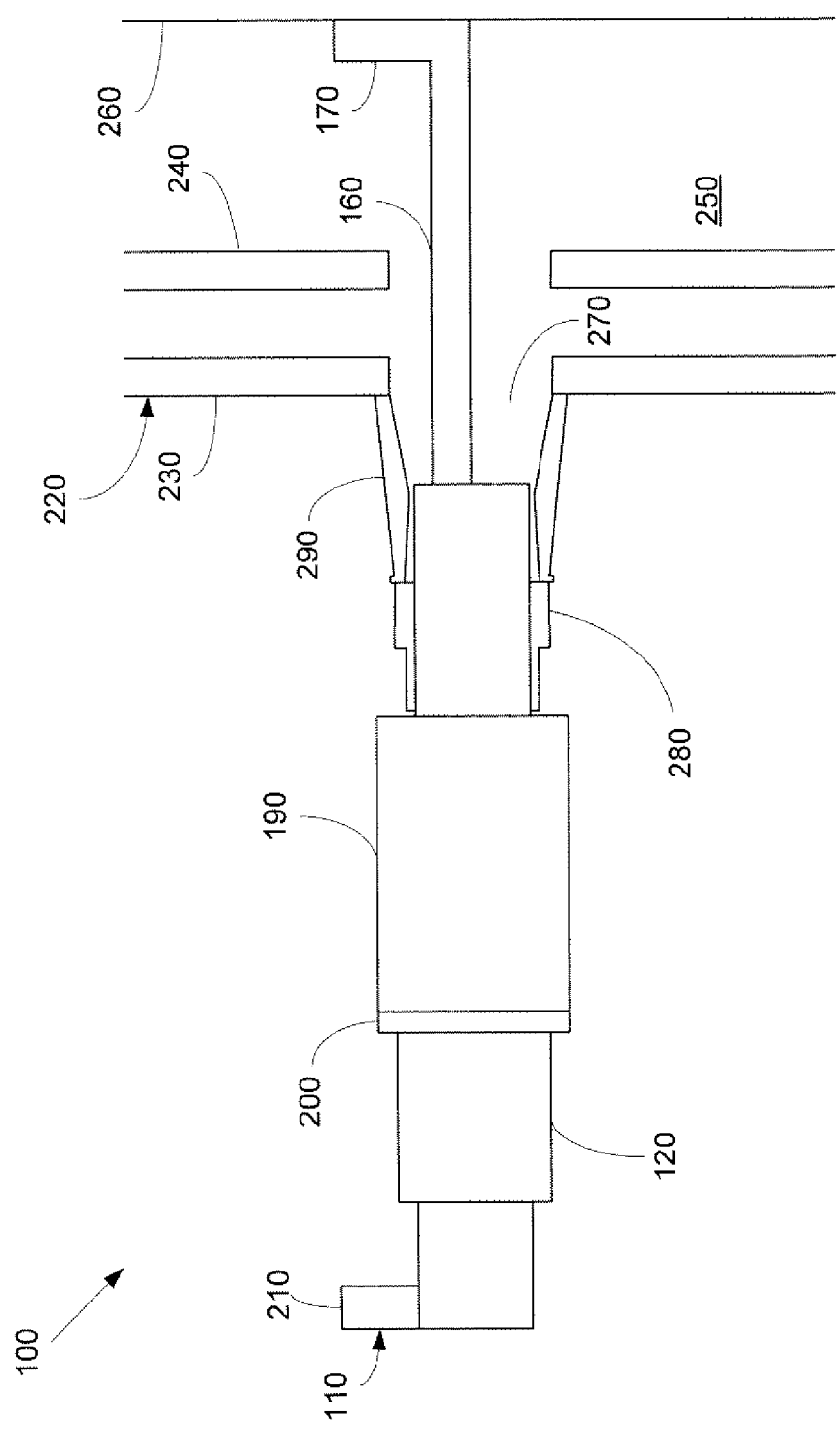
FIG. 2 is a side plan view of the male measurement fixture of FIG. 1 positioned within a combustion casing.

FIG. 2 shows use of the male measurement fixture 110 within a turbine 220. As is shown, the turbine 220 includes a combustion casing 230. The combustion casing 230 defines a flow sleeve 240, a flow path 250, and a liner 260. The turbine 220 also includes a port 270. The port 270 may have a port fitting therein. In this example a Swagelok fitting 280 may be used. (A Swagelok fitting is a multi-piece fitting sold by Swagelok of Solon, Ohio. The port 270 may have a boss 290. The Swagelok fitting 280 may be positioned on the boss 290.

In use, the nut and the ferrules are removed from the base of the Swagelok fitting 280. The locking barrel 190 and the locknut 200 of the male measurement fixture 110 are threaded towards the alignment tab 210 and away from the foot 170. The leg 160 and the foot 170 then may be inserted through the Swagelok fitting 280 and into the flow sleeve 250. The remainder of the male measurement fixture 110 is inserted through the flow sleeve 250 until the foot 170 contacts the liner 260. The alignment tab 210 is then pointed in the desired direction to ensure that the foot 170 is pointing in the desired direction as well. The locking barrel 190 is then threaded towards the Swagelok fitting 280 until the locking barrel 190 comes into contact and the locking nut 200 is threaded into place. The male measurement fixture 110 then may be removed from the port 270.

Figure 3:
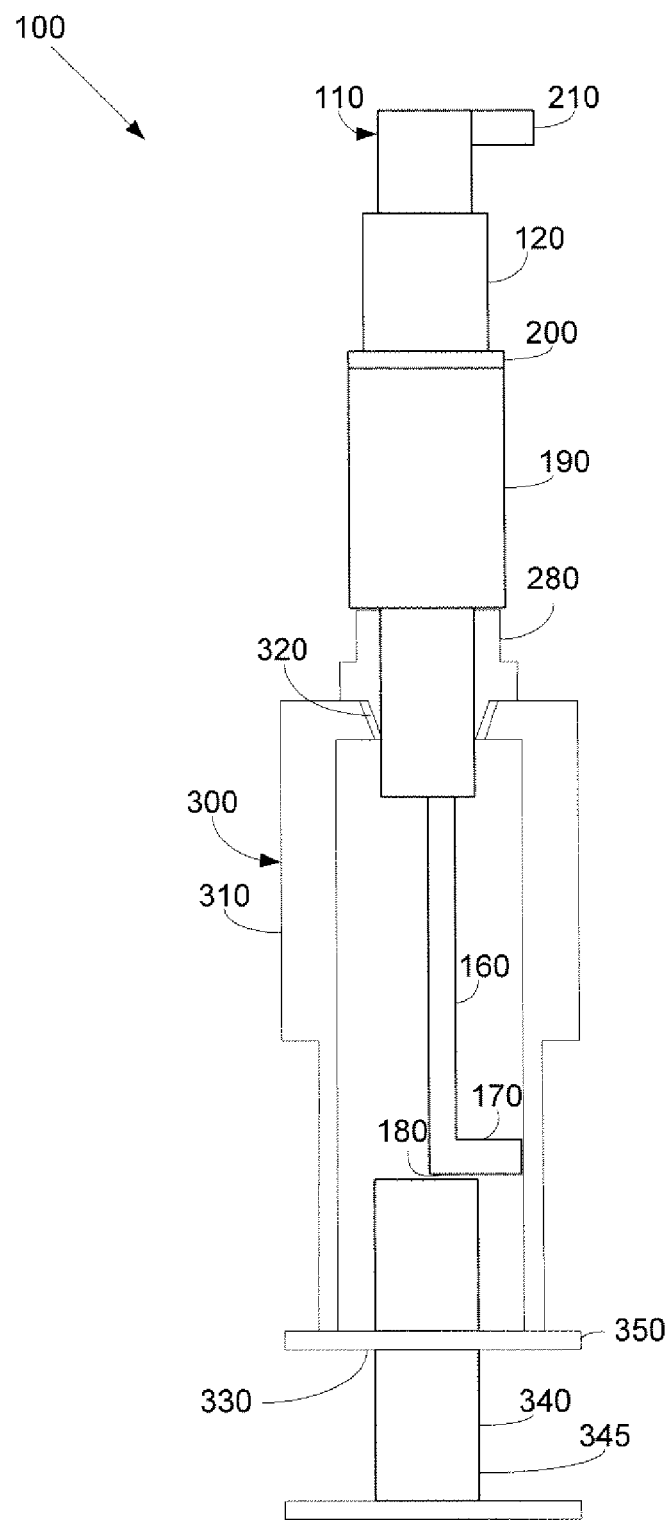
FIG. 3 is a side cross-sectional view of a female measurement fixture cooperating with the male measurement fixture of the depth setting tool as is described herein.

FIG. 3 shows the use of a female measurement fixture 300 of the depth setting tool or kit 100 in connection with the male measurement fixture 110. The female measurement fixture 300 includes a body 310. The body 310 may be largely tubular in shape. The body 310 has a male measurement fixture port 320 on one end and a depth rod port 330 on the other end. The portion of the body 310 about the depth rod port 330 may be threaded. A depth rod 340 may be positioned within the depth rod port 330. In this example, the depth rod 340 may be in the form of a thumbscrew 345. The thumbscrew 345 may be threaded as well. The thumbscrew 345 may be positioned within the body 310 and locked into place via a locknut 350. A Swagelok fitting 280 may be positioned on the male measurement fixture port 320. The Swagelok fitting 280 may be the same or similarly sized to the Swagelok fitting 280 described above.

The female measurement fixture 300 may be made out of stainless steel, standard steel, or similar types of metals. The length of the female measurement fixture 300 may range from about 6.25 to about 6.5 inches (about 15.875 to about 16.51 centimeters) with a width of about 1.8 to about 2.25 inches (about 4.57 to about 5.715 centimeters). The body 310 may have a diameter of about 2 to about 2.25 inches (about 5.08 to about 5.715 centimeters) and a length of about 3.25 to about 3.5 inches (about 8.255 to about 8.89 centimeters). The shape and size of the female measurement fixture 300 as a whole may vary depending upon the nature of the turbine.

In use, the thumbscrew 345 and the locknut 350 are backed out as far as possible. The male measurement fixture 110 is then inserted into the male measurement fixture port 320 of the body 310 until the locking barrel 190 comes into contact with the Swagelok fitting 280. The thumbscrew 345 is then turned until it comes into contact with the foot 170 of the male measurement fixture 110. The locknut 350 then locks the thumbscrew 345 in place. The male measurement fixture 110 then may be removed.

Figure 4:
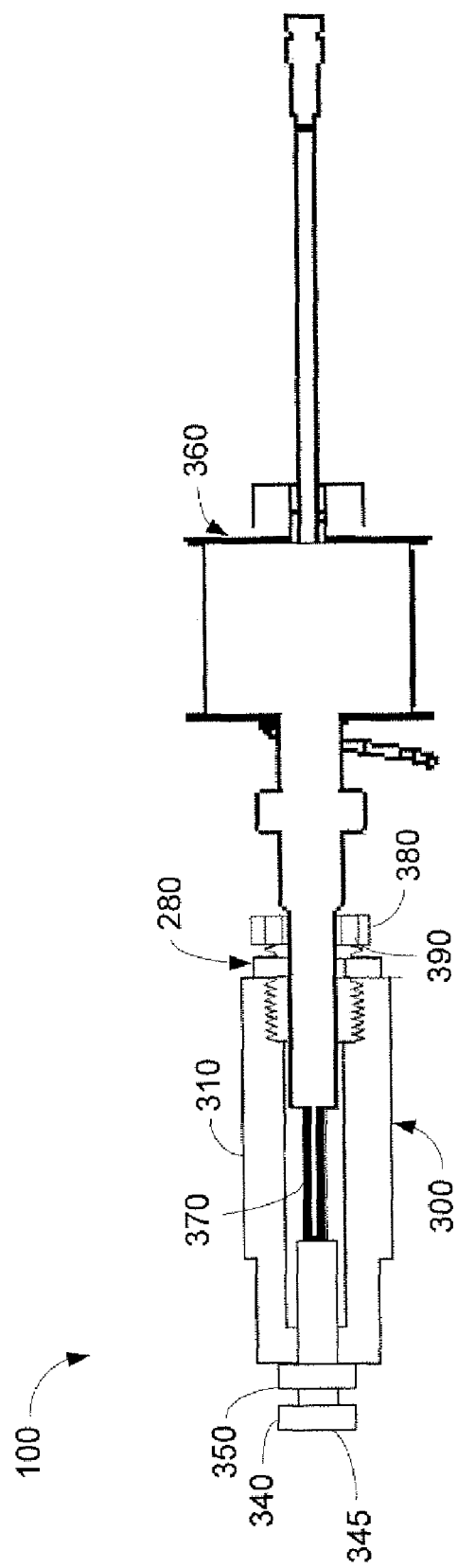
FIG. 4 is a side cross-sectional view of a probe positioned within the female measurement fixture of FIG. 3.

FIG. 4 shows use of the female measurement fixture 300 with a probe 360. The probe 360 may be a combustion dynamics monitor probe or any desired type of measurement device. The probe 360 includes an elongated measurement tip 370. The measurement tip 370 is designed to be located between about zero (0) and about 0.125 inches (about zero (0) to about 3.175 millimeters) from inside the liner 260. Any other position may be used herein.

A Swagelok nut 380 and a pair of Swagelok ferrules 390 are returned to the Swagelok fitting 280 on the female measurement fixture 300. The measurement tip 370 is positioned within the body 310 of the female measurement fixture 300 until the tip 370 contacts the thumbscrew 345. Once installed, the Swagelok nut 380 may be tightened by hand. The Swagelok nut 380 then may be scribed at the three (3) o'clock position. The nut 380 then may be wrenched tightened for one and a quarter (1 and ¼) turns to the nine (9) o'clock position. Once the position of the nut 380 and the ferrules 390 is noted at the nine (9) o'clock position, the nut 380 may be loosened. The probe 360 may be removed from the female measurement fixture 300.

The probe 360 then may be positioned within the port 270. The Swagelok nut 380 then may be tightened to the previous pulled up position. The nut 380 then may be turned an additional quarter (¼) turn to fully seat the ferrules 390. The probe 360 then may be activated.

The measurements taken herein also may be made without the use of the Swagelok fitting 280. in such cases, the target depth may be marked in another manner. For example, the target depth may be indicated simply by marking the location of the barrel 120 with respect to the liner 260. Any type of physical mark may be used.

It should be apparent that the foregoing relates only to the preferred embodiments of the present application and that numerous changes and modifications may be made herein by one of ordinary skill in the art without departing from the general spirit and scope of the invention as defined by the following claims and the equivalents thereof.

We claim:

1. A kit for setting turbine probe depth, comprising:
a male measurement fixture;
the male measurement fixture comprising an extended leg, a foot extending outwardly from the leg in a direction lateral to the leg, and an alignment barrel; and
a female measurement fixture;
the female measurement fixture comprising a depth rod.

2. The kit of claim 1, wherein the alignment barrel comprises a threaded portion.

3. The kit of claim 2, wherein the alignment barrel comprises a locking barrel positioned on the threaded portion.

4. The kit of claim 2, wherein the alignment barrel comprises a lock nut positioned on the threaded portion.

5. The kit of claim 1, wherein the foot comprises a nipple.

6. The kit of claim 5, wherein the nipple comprises a depth that is about 0.1 inches (about 2.54 millimeters) or less.

7. The kit of claim 1, wherein the leg comprises an offset position adjacent to the alignment barrel.

8. The kit of claim 1, wherein the male measurement fixture comprises an alignment tab positioned about the alignment barrel.

9. The kit of claim 1, wherein the female measurement fixture comprises a substantially hollow body.

10. The kit of claim 9, wherein the hollow body comprises a male measurement fixture port and a depth rod port.

11. The kit of claim 10, wherein the depth rod port is threaded and wherein the depth rod comprises a screw.

12. The kit of claim 10, wherein the female measurement fixture comprises a port fitting positioned about the male measurement fixture port.

13. The kit of claim 12, wherein the port fitting comprises a nut and a pair of ferrules.

14. A method of placing a probe at a target depth within a turbine casing, the turbine casing having a liner, the method comprising:
measuring a distance from a port fitting to a given distance from the liner with a first tool, the first tool comprising a foot and a nipple, the foot extending outward from the tool in a lateral direction, the distance from the port fitting being measured by contacting the liner with the foot, the nipple extending the given distance past the foot;
manipulating the first tool to indicate the distance;
inserting the first tool into a second tool;
manipulating the second tool to indicate internally the distance;
removing the first tool from the second tool;
inserting the probe into the second tool and the port fitting; and
manipulating the port fitting to indicate the distance.

15. The method of claim 14, wherein the step of manipulating the first tool comprises turning a locking barrel on an alignment barrel.

16. The method of claim 14, wherein the step of manipulating the second tool comprises adjusting a depth rod.

17. The method of claim 14, wherein the step of manipulating the port fitting comprises adjusting a pair of ferrules.

18. A kit for setting turbine probe depth, comprising:
a male measurement fixture comprising:
a leg extending in a longitudinal direction,
a foot positioned at a distal end of the leg, the foot extending in a lateral direction,
an indicator that is selectively movable and lockable in the longitudinal direction, and
a female measurement fixture comprising:
a body shaped to receive the leg and the foot of the male measurement fixture, and
a depth rod adjustably positioned in the body.

19. The kit of claim 18, wherein the foot comprises a nipple.

20. The kit of claim 18, wherein the male measurement fixture comprises an alignment tab, the alignment tab pointing in substantially the lateral direction.

* * * * *